(12) United States Patent
Moon

(10) Patent No.: US 6,796,678 B2
(45) Date of Patent: Sep. 28, 2004

(54) BACKLIGHT DEVICE AND METHOD OF FABRICATING THE SAME

(75) Inventor: Jeong Min Moon, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/327,194

(22) Filed: Dec. 24, 2002

(65) Prior Publication Data

US 2003/0218877 A1 Nov. 27, 2003

(30) Foreign Application Priority Data

May 22, 2002  (KR) ................................ 10-2002-0028429

(51) Int. Cl.[7] ............................................ F21Y 113/00
(52) U.S. Cl. ........................ 362/225; 362/249; 362/33
(58) Field of Search ................................ 362/249, 225, 362/33

(56) References Cited

U.S. PATENT DOCUMENTS 6,527,414 B2 * 3/2003 Moon ......................... 362/249

* cited by examiner

Primary Examiner—Stephen Husar
Assistant Examiner—Anabel Ton
(74) Attorney, Agent, or Firm—Morgan, Lewis & Bockius, LLP

(57) ABSTRACT

A backlight device includes a plurality of fluorescent lamps arranged parallel with each other along a first direction, first and second lamp fixing assemblies arranged facing each other along a second direction, the first and second lamp fixing assemblies having a plurality of at least once bent grooves to receive both ends of the fluorescent lamps, a plurality of lamp holders disposed within the grooves to affix both ends of each of the plurality of fluorescent lamps to the grooves, and first and second conductive layers disposed at the first and second lamp fixing assemblies to supply a voltage to the fluorescent lamps.

30 Claims, 16 Drawing Sheets

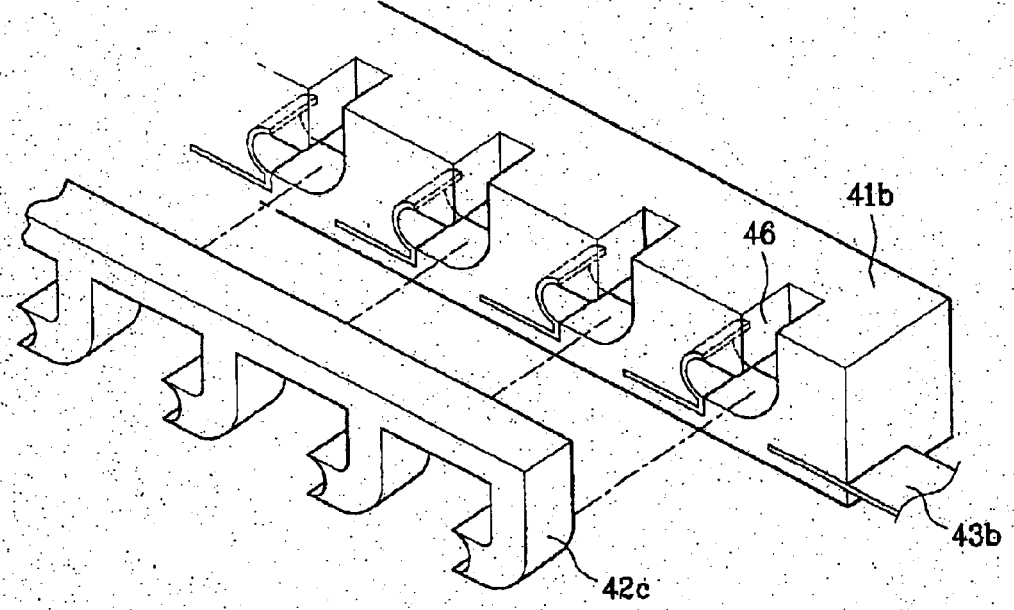

BACKLIGHT DEVICE AND METHOD OF FABRICATING THE SAME

The present invention claims the benefit of the Korean Patent Application No. P2002-28429 filed in Korea on May 22, 2002, which is hereby incorporated by reference.

BACKGROUND OF THE INVENTION

1. Field of the Invention

The present invention relates to a backlight device and a method of fabricating the same, and more particularly, to a direct-type backlight device and a method of fabricating the same for a liquid crystal display.

2. Discussion of the Related Art

In general, cathode ray tubes (CRTs) are commonly employed as display devices for televisions, machines, and information terminals. However, CRTs fail to meet the current trend of miniature and light weight electronic products due to the size and weight of CRTs. Thus, many efforts have been made to study and develop various types of display devices as substitutions for CRTs, such as liquid crystal display devices (LCDs), plasma display panels (PDPs), electro-luminescence displays (ELDs), and vacuum fluorescent displays (VFDs). For example, LCDs have been actively developed as flat display panels in laptop computers, desktop computers, and large-sized information displays because of their high quality image, lightness, small thickness, compact size, and low power consumption. Most LCDs are passive devices in which images are displayed by controlling an amount of light input from an outside light source. Thus, a separate light source (backlight device) is generally employed for irradiating a LCD.

There are two types of backlight device, an edge light-type and a direct-type, based on arrangement of the cylindrical fluorescent lamp within the device. An edge light-type backlight device has a lamp unit installed at a side portion of a light guiding plate for guiding light. Further, the lamp unit includes a lamp for emitting light, a lamp holder inserted at both ends of the lamp for protecting the lamp, and a lamp reflective plate for enclosing an outer circumference of the lamp, such that the reflective plate reflects the light generated from the lamp toward the light guiding plate. Alternatively, lamp units can be installed at opposing side portions of the light guiding plate to form a dual edge light-type backlight device, such that if one lamp unit fails to turn on, the luminance of the screen is lowered but an image can still be displayed as a whole on a LCD panel. Moreover, the edge light-type backlight devices are commonly employed in small-sized LCDs of the laptop computer and desktop computer because they produce uniform light, have high endurance and maintain sliminess of the LCDs.

A direct-type backlight device has a plurality of lamps arranged in series to directly irradiate an entire surface of a LCD panel. The direct-type backlight devices are mainly used in large-sized LCDs (20 inches or more), and they have higher efficiency of light usage and longer lifetime than the edge light-type backlight devices. However, LCDs employing the direct-type backlight device are more susceptible to a failed lamp, such that if one lamp unit fails, the portion where the lamp is not turned on becomes remarkably dark and a portion of an image may be lost on a LCD panel. Accordingly, the lamps of the direct-type backlight devices are frequently replaced.

FIG. 1 is a perspective view of an edge light-type backlight device according to the related art, and FIG. 2 is a perspective view of a connector connected with a fluorescent lamp of an edge light-type backlight device according to the related art. In FIG. 1, an edge light-type backlight device of a LCD includes a plurality of fluorescent lamps 1, an outer case 3 for fixedly supporting the fluorescent lamps 1, and a light scattering system 5a, 5b, and 5c arranged between the fluorescent lamps 1 and the LCD panel (not shown). The light scattering system 5a, 5b, and 5c prevents the shape of the fluorescent lamps 1 from appearing on a display surface of the LCD panel, and uniformly distribute light generated from the fluorescent lamps 1. The light scattering system 5a, 5b, and 5c are composed a plurality of diffusion sheets and diffusion plates. Further, a reflective plate is formed on an inner bottom surface of the outer case 3 to reflect the light generated from the fluorescent lamps 1 toward the display surface of the LCD panel, thereby maximizing the luminance of the LCD panel.

In FIG. 2, a fluorescent lamp 1 is a cold cathode fluorescent lamp having internal electrodes 2 and 2a at the ends thereof, such that the fluorescent lamp 1 emits light when a power is applied to the electrodes 2 and 2a. In FIG. 1, the ends of the fluorescent lamp 1 are inserted in openings formed at opposing faces of the outer case 3. Power incoming lines 9 and 9a are connected to the ends of the fluorescent lamp 1 and to a connector 11 for transferring a lamp driving power to the fluorescent lamp 1 from a driving circuit (not shown).

However, in the aforementioned backlight device, a connector is necessary for every fluorescent lamp, such that the interconnection of the plurality of fluorescent lamps becomes complicated. Also, to decrease the thickness of the backlight device, a further step of bending the power incoming lines is needed when the power incoming lines are connected to the connector, thereby increasing production time and production cost. Moreover, an opening of the outer case has to be made to hold the fluorescent lamp and to expose the electrodes of the fluorescent lamp, thereby making maintenance and repair of the fluorescent lamp difficult.

SUMMARY OF THE INVENTION

Accordingly, the present invention is directed to a backlight device and a method of fabricating the same that substantially obviates one or more problems due to limitations and disadvantages of the related art.

An object of the present invention is to provide a backlight device and a method of fabricating the same in which the assembling work of the lamps is simplified, the productivity is maximized, and the maintenance and repair are easy.

Another object of the present invention is to provide a backlight assembly made in a structure capable of preventing the fluorescent lamp from being damaged due to an external impact.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight device includes a plurality of fluorescent lamps arranged parallel with each other along a first direction, first and second lamp fixing assemblies arranged facing each other along a second direction, the first and second lamp fixing assemblies having a plurality of at least once bent grooves to receive both ends of the fluorescent lamps, a plurality of lamp holders disposed within the grooves to affix both ends of each of the plurality of fluorescent lamps to the grooves, and first and second conductive layers disposed at the first and second lamp fixing assemblies to supply a voltage to the fluorescent lamps.

In another aspect, a method of fabricating a backlight device includes forming first and second lamp fixing assemblies facing each other along a first direction, forming a plurality of at least once bent grooves in the first and second lamp fixing assemblies along a second direction, arranging ends of a plurality of fluorescent lamps within the grooves, disposing a plurality of lamp holders within the grooves to affix the ends of each of fluorescent lamps to the grooves, and disposing first and second conductive layers at the first and second lamp fixing assemblies to apply a voltage to the fluorescent lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 5A–5C, 6A–6C, 7A, and 7B are perspective views of an exemplary lamp fixing assembly and exemplary lamp holders of a backlight device according to the present invention;

DETAILED DESCRIPTION OF THE INVENTION

Reference will now be made in detail to the preferred embodiments of the present invention, examples of which are illustrated in the accompanying drawings.

Figure 1:
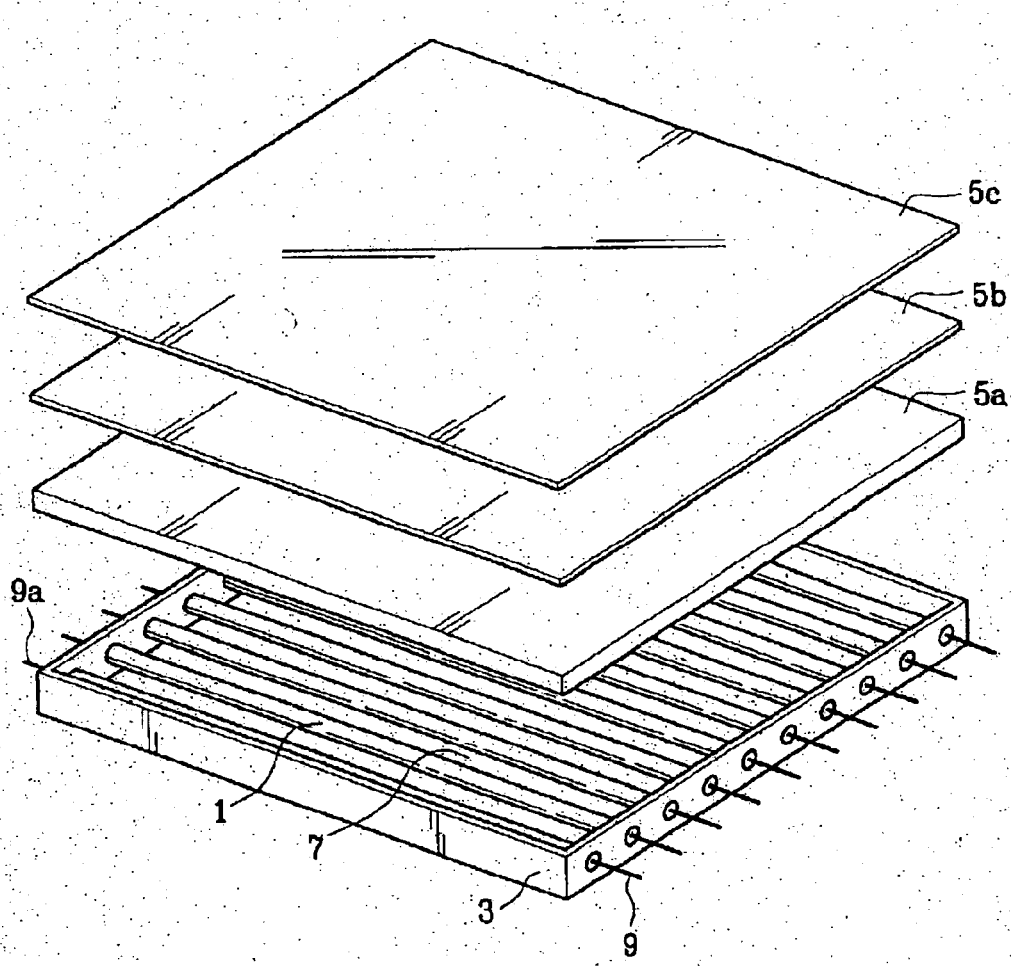
FIG. 1 is a perspective view of an edge light-type backlight device according to the related art.
Figure 2:
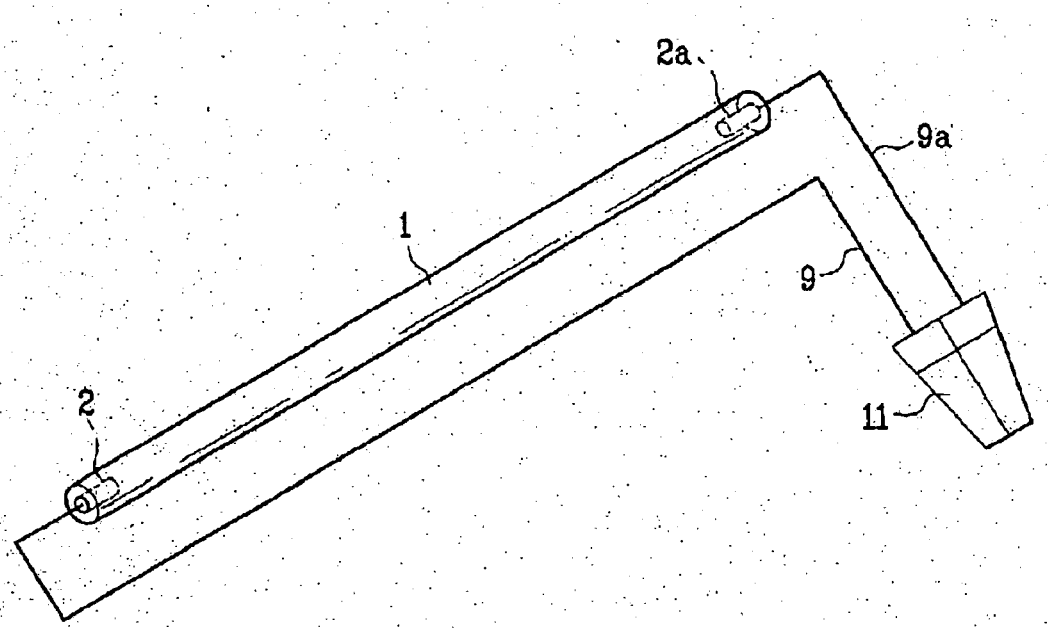
FIG. 2 is a perspective view of a connector connected with a fluorescent lamp of an edge light-type backlight device according to the related art.
Figure 3A:
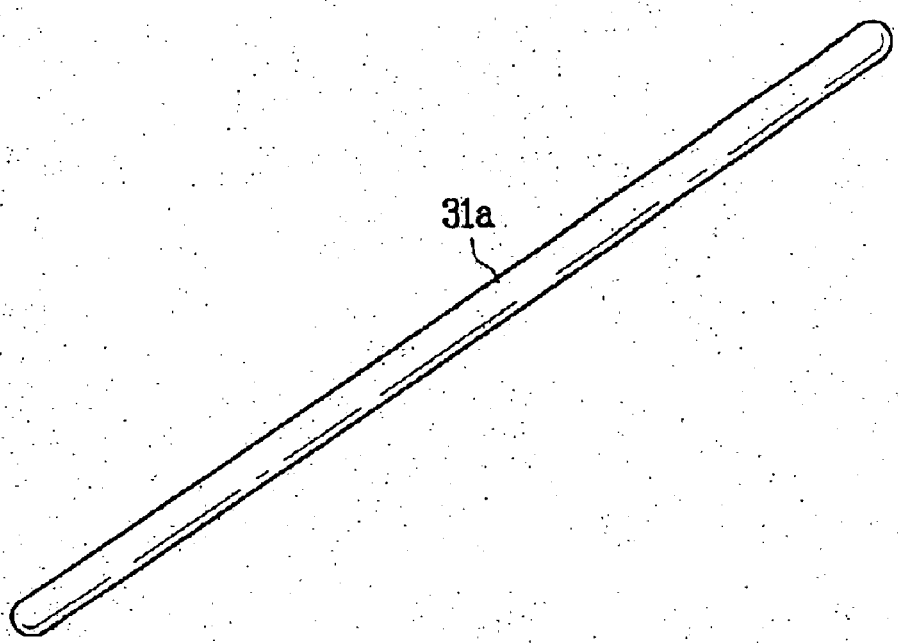
FIGS. 3A and 3B are perspective views of exemplary fluorescent lamps of a backlight device according to the present invention.
Figure 3B:
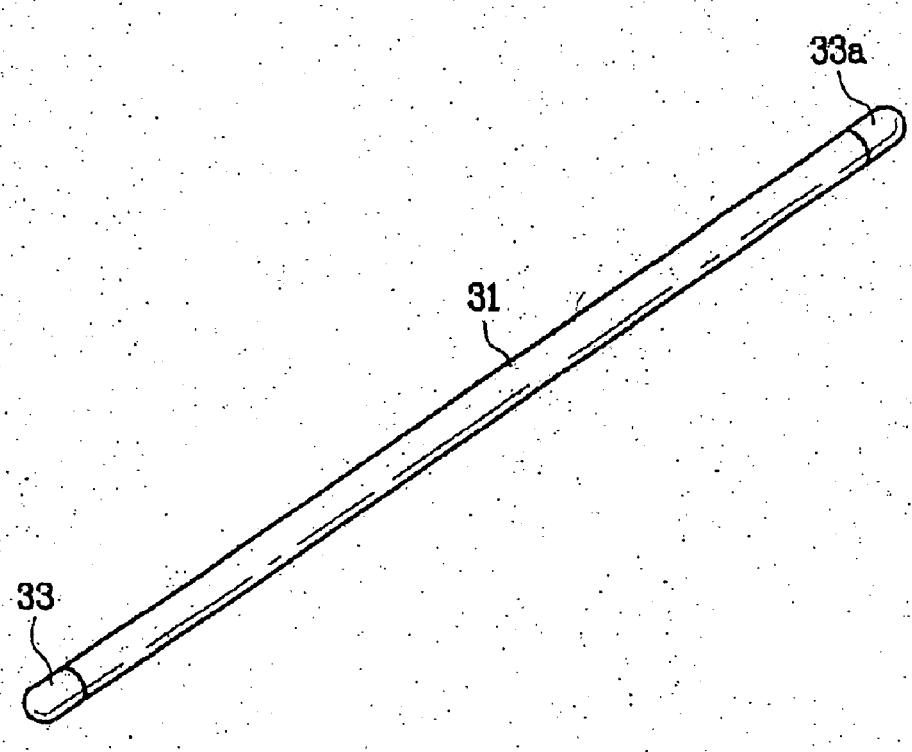

FIGS. 3A and 3B are perspective views of exemplary fluorescent lamps of a backlight device according to the present invention. In FIG. 3A, an electrodeless fluorescent lamp 31a may not have any electrode. In FIG. 3B, an external electrode fluorescent lamp 31 may have external electrodes 33 and 33a at its ends.

Figure 4:
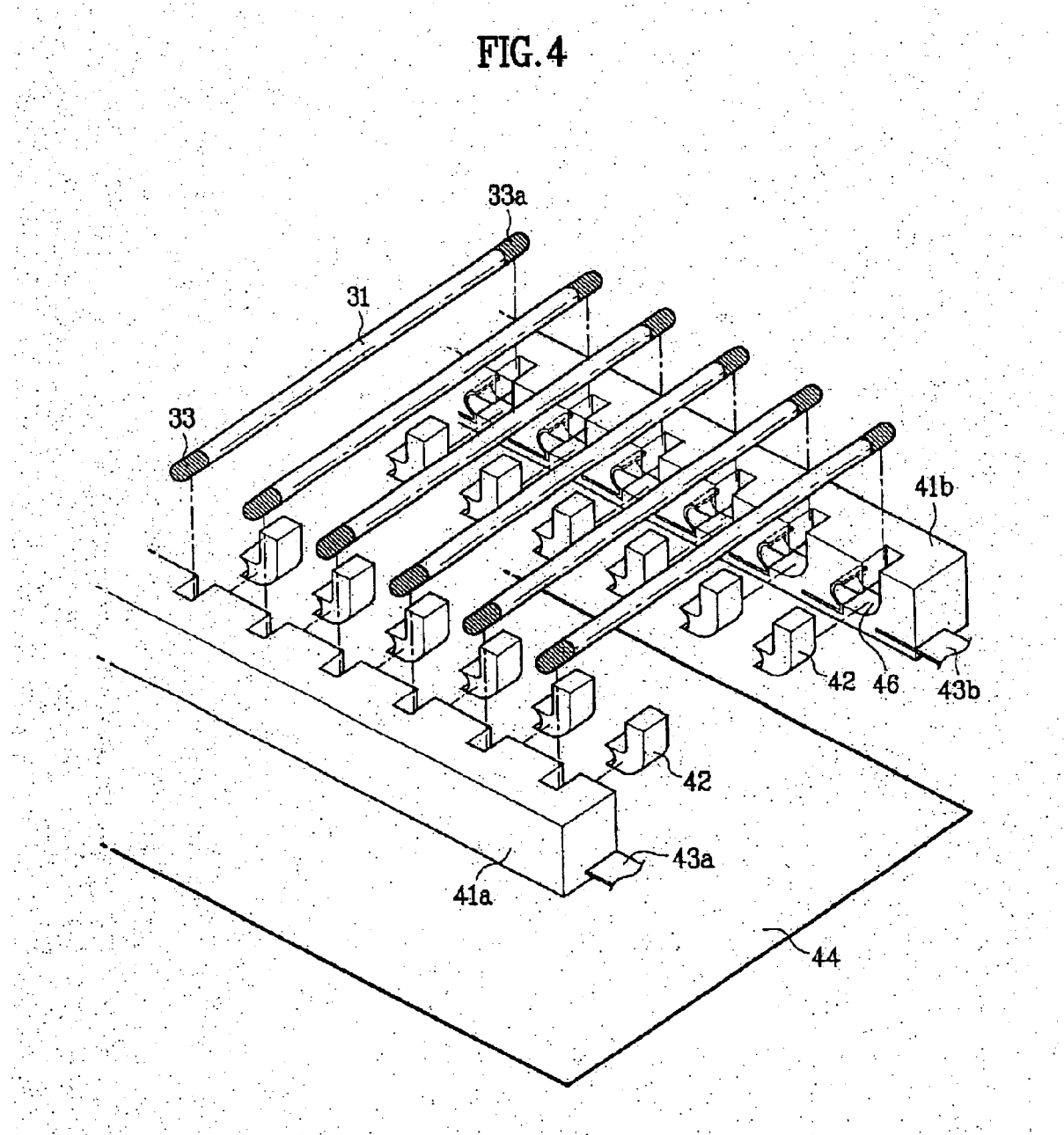
FIG. 4 is a perspective view of an exemplary edge light-type backlight device according to the present invention.

FIG. 4 is a perspective view of an exemplary edge light-type backlight device according to the present invention. In FIG. 4, a backlight device may include a plurality of fluorescent lamps 31 arranged parallel with each other, first and second lamp fixing assemblies 41a and 41b arranged facing each other, a plurality of holders 42, conductive layers 43a and 43b arranged contacting the fluorescent lamps 31, and a reflective plate 44 arranged in a region between the first and second lamp fixing assemblies 41a and 41b, and below the fluorescent lamps 31. The fluorescent lamps 31 may have external electrodes 33 and 33a at both ends thereof. Alternatively, instead of fluorescent lamp 31, the backlight device may include the electrodeless fluorescent lamp 31a, as shown in FIG. 3A.

The lamp fixing assemblies 41a and 41b may have once-bent grooves 46 to receive both ends of the fluorescent lamps 31 and to fixedly arrange the fluorescent lamps 31 at a predetermined location. Moreover, the holders 42 may have a shape matched with a remaining space of the grooves 46 after ends of the fluorescent lamp 31 are placed inside the grooves 46. Accordingly, the fluorescent lamps 31 and the lamp holders 42 may be equipped from a side direction where the grooves 46 are formed, and the fluorescent lamps 31 may be securely fixed from vibration or external impact, thereby enhancing the contact between the conductive layers 43a and 43b and the fluorescent lamps 31.

The first and second lamp fixing assemblies 41a and 41b and the lamp holders 42 may be non-conductive, and may be made of an elastic material or rigid material, such as rubber, acryl, poly-carbonate (PC) or plastic. In addition, the first and second lamp fixing assemblies 41a and 41b may be an integral type in which an upper portion is not separated from a lower portion.

The conductive layers 43a and 43b may be disposed along one surface of the grooves 46 within the first and second lamp fixing assemblies 41a and 41b, respectively, for electrically connected with the fluorescent lamps 31 to an external lamp drive device (not shown). Moreover, the conductive layers 43a and 43b may be arranged along the length direction of the first and second lamp fixing assemblies 41a and 41b, and may be made of a material having a good conductivity, such as a metal plate, a conductive paste, and a conductive coating film. In addition, the conductive layers 43a and 43b may be made of a conductive material that is deformable, such as copper. Accordingly, the conductive layers 43a and 43b may be a power connection for the fluorescent lamps 31. In addition, when the backlight device employs the electrodeless fluorescent lamps 31a, as shown in FIG. 3a, the conductive layers 43a and 43b may also function as electrodes for the electrodeless fluorescent lamps 31a.

In addition, the backlight device may further include a light scattering member (not shown), such as a diffusion sheet or a diffusion plate, arranged above the first and second lamp fixing assemblies 41a and 41b for uniformly distributing light emitted from the fluorescent lamps 31 onto a LCD panel (not shown).

Figure 5A:
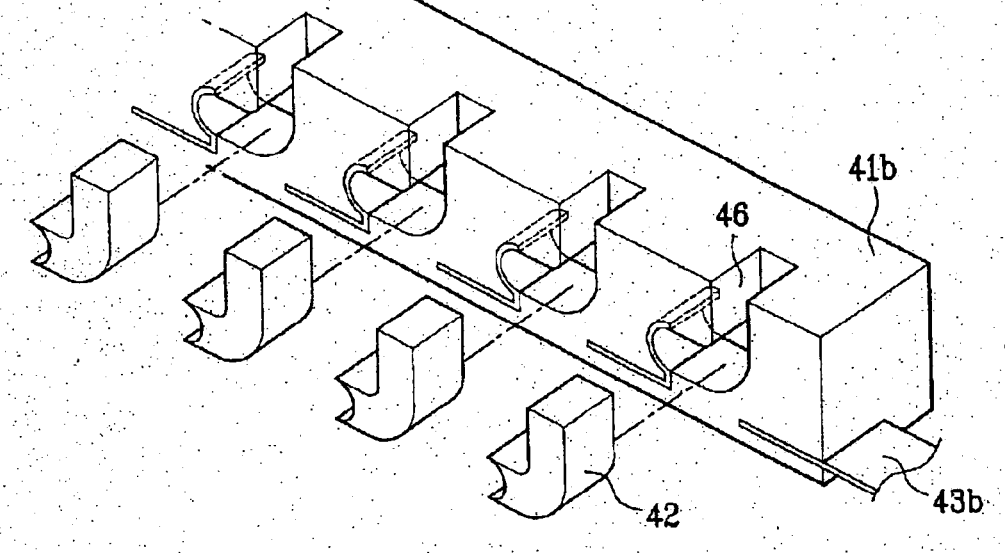

FIGS. 5A–5C, 6A–6C, 7A, and 7B are perspective views of an exemplary lamp fixing assembly and exemplary lamp holders of a backlight device according to the present invention. In FIG. 5A, grooves 46 may be formed along a perpendicular direction from an upper surface of a lamp fixing assembly 41b, and then bent along a left horizontal direction. In addition, lamp holders 42 may be arranged in the respective grooves 46 to completely fill the remaining spaces of the grooves 46 after fluorescent lamps are arranged in the grooves 46. Furthermore, a conductive layer 43b may extend to contact one surface of each of the grooves 46 in which the fluorescent lamps are to be arranged.

Figure 5B:
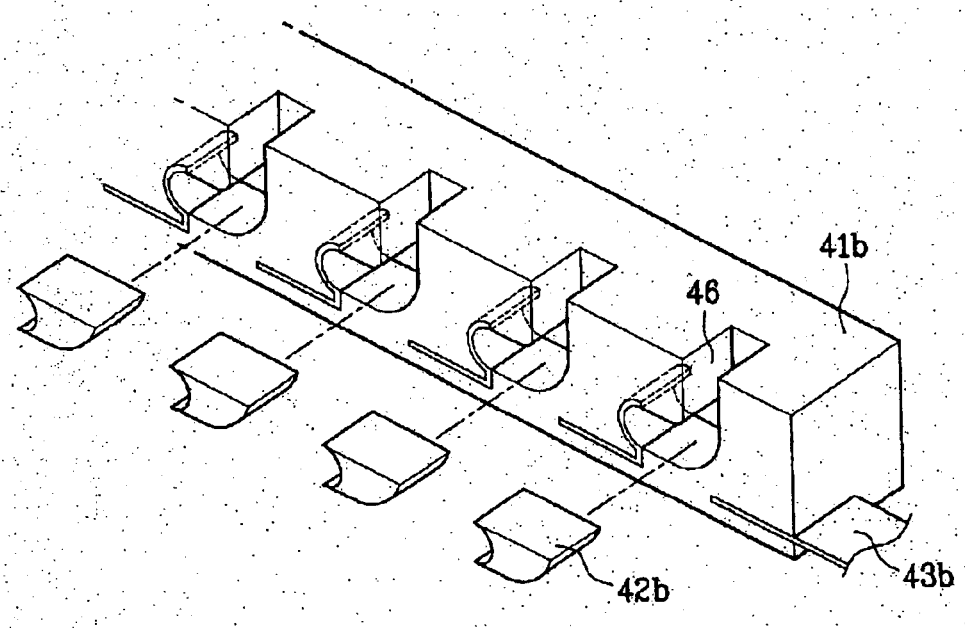

In FIG. 5B, grooves 46 may be formed along a perpendicular direction from an upper surface of a lamp fixing assembly 41b, and then bent along a left horizontal direction. Lamp holders 42b may be arranged in the respective grooves 46 to partially fill the spaces of the grooves 46 along the horizontal direction, thereby affixing fluorescent lamps in the grooves 46. Also, a conductive layer 43b may extend to contact one surface of each of the grooves 46 in which the fluorescent lamps are to be arranged.

In FIG. 5C, grooves 46 may be formed along a perpendicular direction from an upper surface of a lamp fixing assembly 41b, and then bent along a left horizontal direction. Lamp holders 42c may be arranged in the respective grooves 46 to completely fill the spaces of the grooves 46 after fluorescent lamps are arranged in the grooves 46. Two or more of the lamp holders 42c may also be integrally formed, thereby making the installment and replacement of the lamp holders 42c easier. In addition, a conductive layer 43b may extend to contact one surface of each of the grooves 46 in which the fluorescent lamps are to be arranged.

Figure 6A:
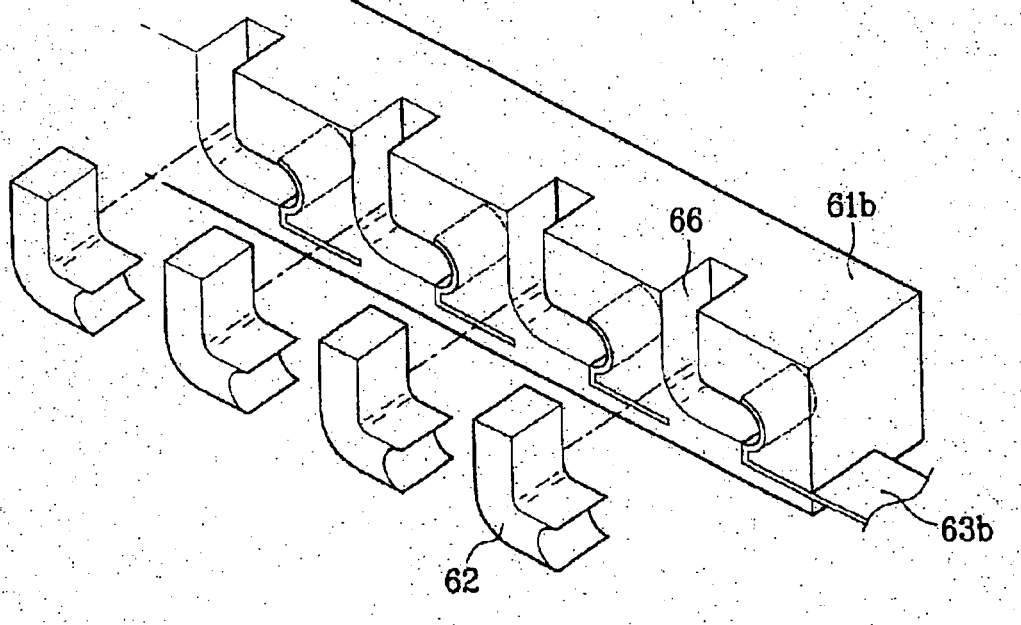

In FIG. 6A, grooves 66 may be formed along a perpendicular direction from an upper surface of the of a lamp fixing assembly 61b, and then bent along a right horizontal direction. Lamp holders 62 may be arranged in the respective grooves 66 to completely fill the spaces of the grooves 66 after fluorescent lamps are arranged in the grooves 66. In addition, a conductive layer 63b may extend to contact one surface of each of the grooves 66 in which the fluorescent lamps are to be arranged.

Figure 6B:
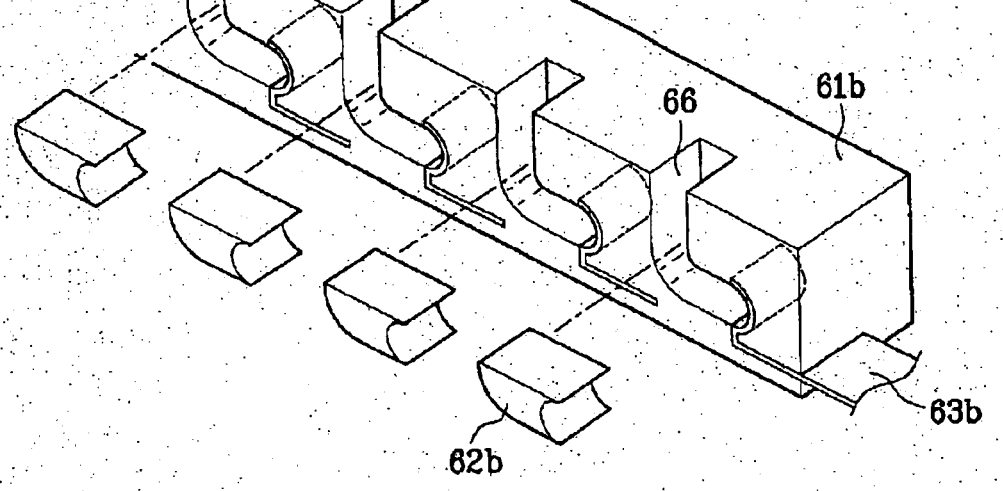

In FIG. 6B, grooves 66 may be formed along a perpendicular direction from an upper surface of the of a lamp fixing assembly 61b, and then bent along a right horizontal direction. Lamp holders 62b may be arranged in the respective grooves 66 to partially fill the spaces of the grooves 66 along the horizontal direction, thereby affixing fluorescent lamps in the grooves 66. In addition, a conductive layer 63b may extend to contact one surface of each of the grooves 66 in which the fluorescent lamps are to be arranged.

Figure 6C:
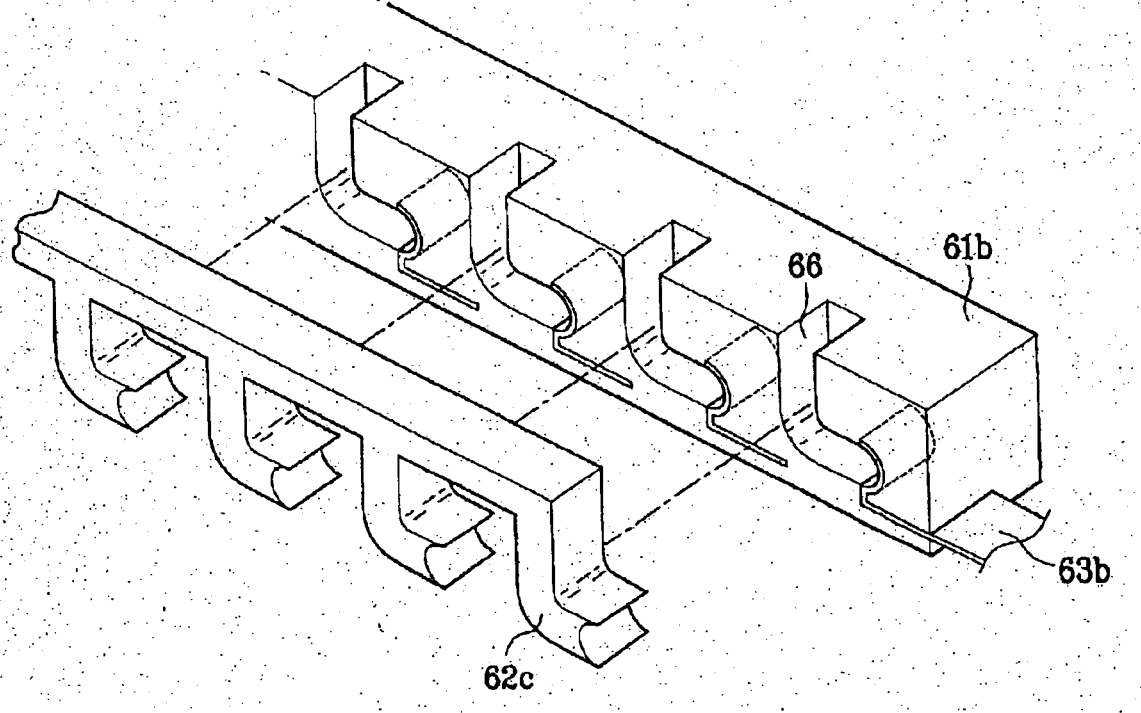

In FIG. 6C, grooves 66 may be formed along a perpendicular direction from an upper surface of the of a lamp fixing assembly 61b, and then bent along a right horizontal direction. Lamp holders 62c may be arranged in the respective grooves 66 to completely fill the spaces of the grooves 66 after fluorescent lamps are arranged in the grooves 66. Two or more of the lamp holders 62c may also be integrally formed, thereby making the installment and replacement of the lamp holders 62c easier. In addition, a conductive layer 63b may extend to contact one surface of each of the grooves 66 in which the fluorescent lamps are to be arranged.

Figure 7A:
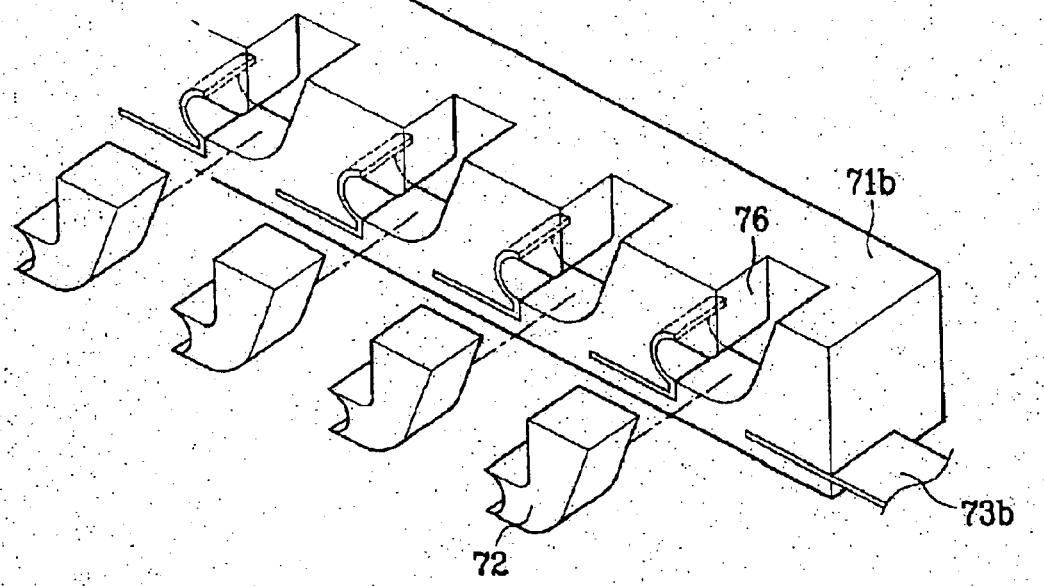

In FIG. 7A, grooves 76 may be formed along a downward direction from an upper surface of a lamp fixing assembly 71b, and then bent by a predetermined length, wherein the grooves 76 may have a tapering width and may eventually be of the same width as the diameter of the fluorescent lamp. Lamp holders 72 may be arranged in the respective grooves 76 to completely fill the spaces of the grooves 76 after fluorescent lamps are arranged in the grooves 76. Accordingly, the grooves 76 may not be of a completely bent shape, and since the lamp holders 72 may be shaped to completely fill the remaining spaces of grooves 76, the fluorescent lamp may still be securely fixed in the grooves 76. Also, a conductive layer 73b may extend to contact one surface of each of the grooves 76 in which the fluorescent lamps are to be arranged.

Figure 7B:
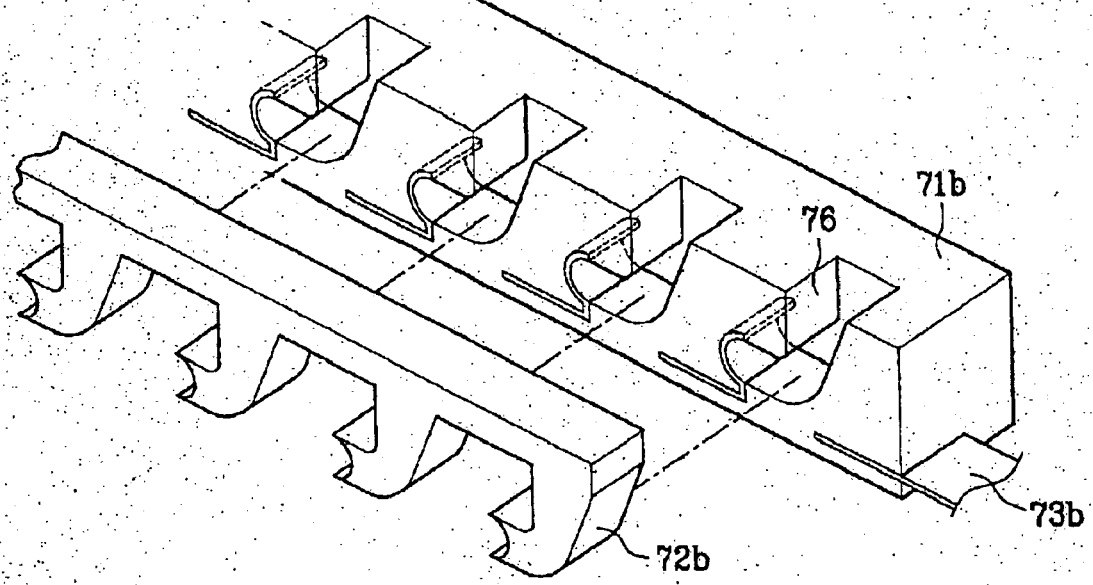

In FIG. 7B, grooves 76 may be formed along a downward direction from an upper surface of a lamp fixing assembly 71b, and then bent by a predetermined length, wherein the grooves 76 may have a tapering width and may eventually be of the same width as the diameter of the fluorescent lamp. Lamp holders 72b may be arranged in the respective grooves 76 to completely fill the spaces of the grooves 76 after fluorescent lamps are arranged in the grooves 76. Accordingly, the grooves 76 may not be of a completely bent shape, and since the lamp holders 72b may be shaped to completely fill the remaining spaces of grooves 76, the fluorescent lamp may still be securely fixed in the grooves 76. Further, two or more of the lamp holders 72b may also be integrally formed, thereby making the installment and replacement of the lamp holders 72b easier. In addition, a conductive layer 73b may extend to contact one surface of each of the grooves 76 in which the fluorescent lamps are to be arranged.

Figure 8A:
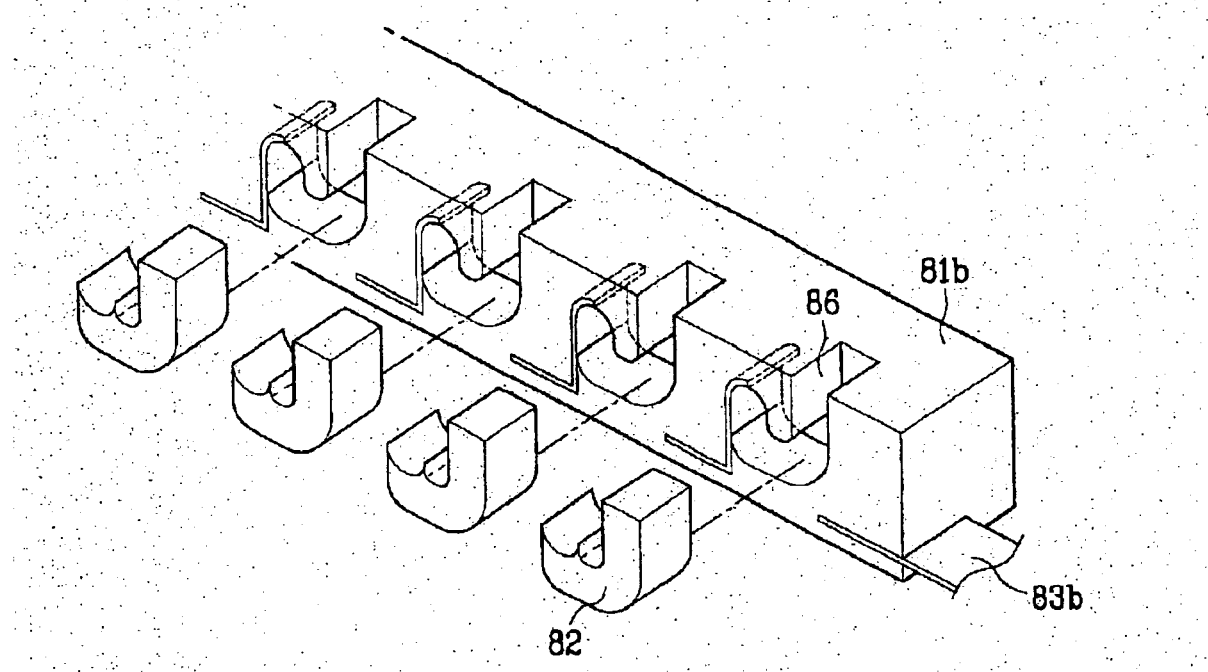
FIGS. 8A–8C are perspective views of another exemplary lamp fixing assembly and another exemplary lamp holders of a backlight device according to the present invention.
Figure 8B:
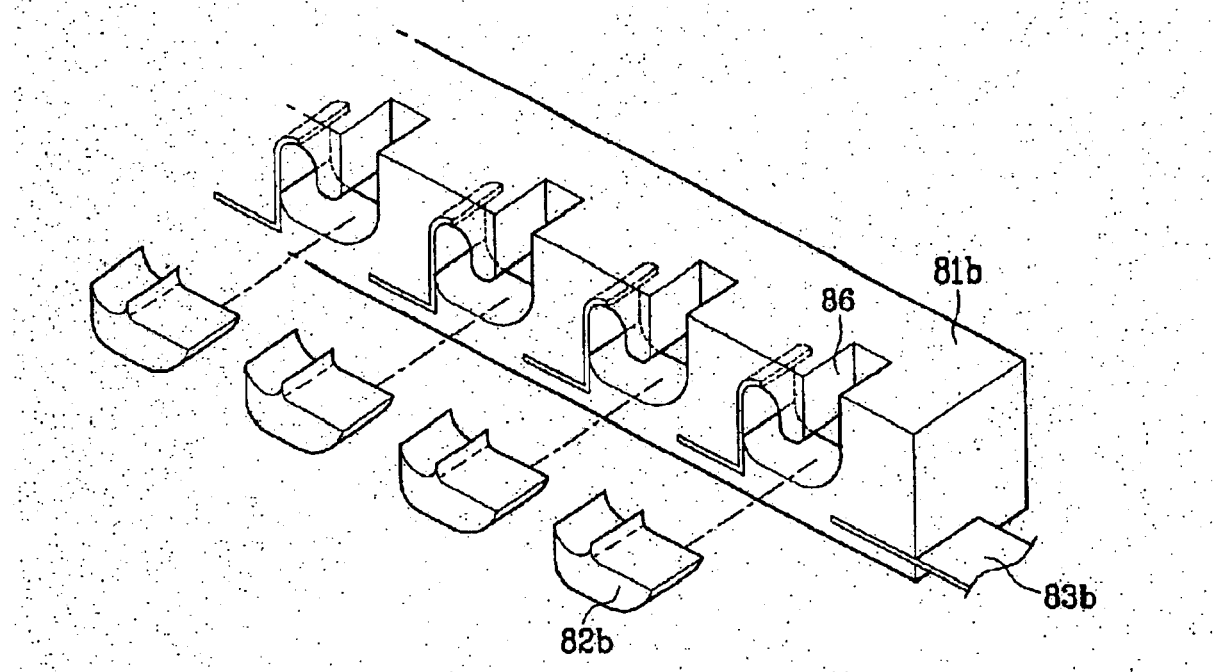
Figure 8C:
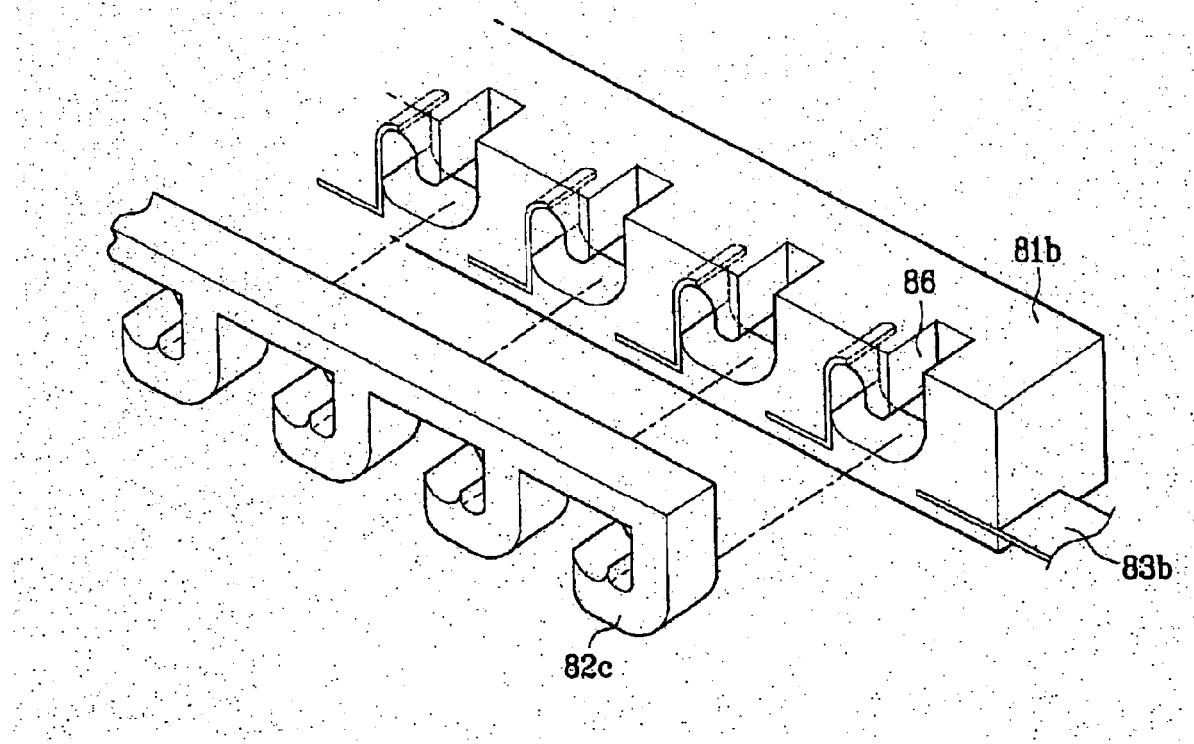

FIGS. 8A–8C are perspective views of another exemplary lamp fixing assembly and another exemplary lamp holders of a backlight device according to the present invention. In FIG. 8A, twice bent grooves 86 may be formed along a perpendicular direction from an upper surface of a lamp fixing assembly 81b, first bent along a horizontal direction, and again bent along an upward vertical direction. In addition, lamp holders 82 may be arranged in the respective grooves 86 to completely fill the remaining spaces of the grooves 86 after fluorescent lamps are arranged in the grooves 86. Furthermore, a conductive layer 83b may extend to contact one surface of each of the grooves 86 in which the fluorescent lamps are to be arranged.

In FIG. 8B, lamp holders 82b may be arranged in respective twice bent grooves 86 to partially fill the spaces of grooves 86 along the horizontal direction and along the upward vertical direction, thereby affixing fluorescent lamps in the grooves 86. In FIG. 8C, lamp holders 82c may be arranged in respective twice bent grooves 86 to completely fill the remaining spaces of the grooves 86 after fluorescent lamps are arranged in the grooves 86. Also, two or more of the lamp holders 82c may also be integrally formed, thereby making the installment/replacement of the lamp holders 82c easier.

Figure 9A:
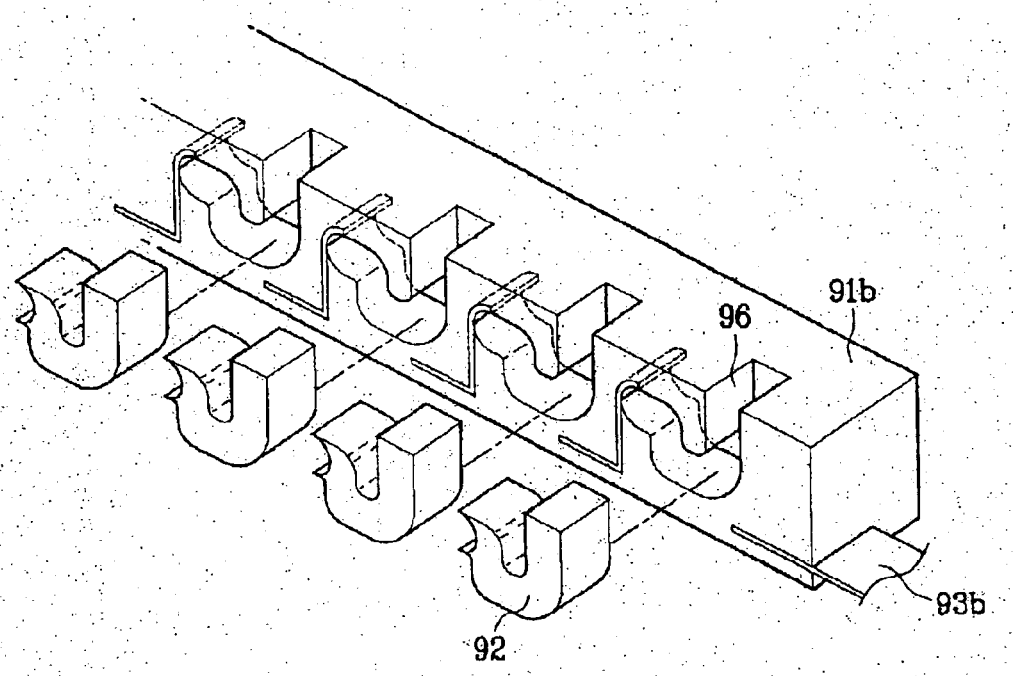
FIGS. 9A–9C are perspective views of another exemplary lamp fixing assembly and another exemplary lamp holder of a backlight device according to the present invention.
Figure 9B:
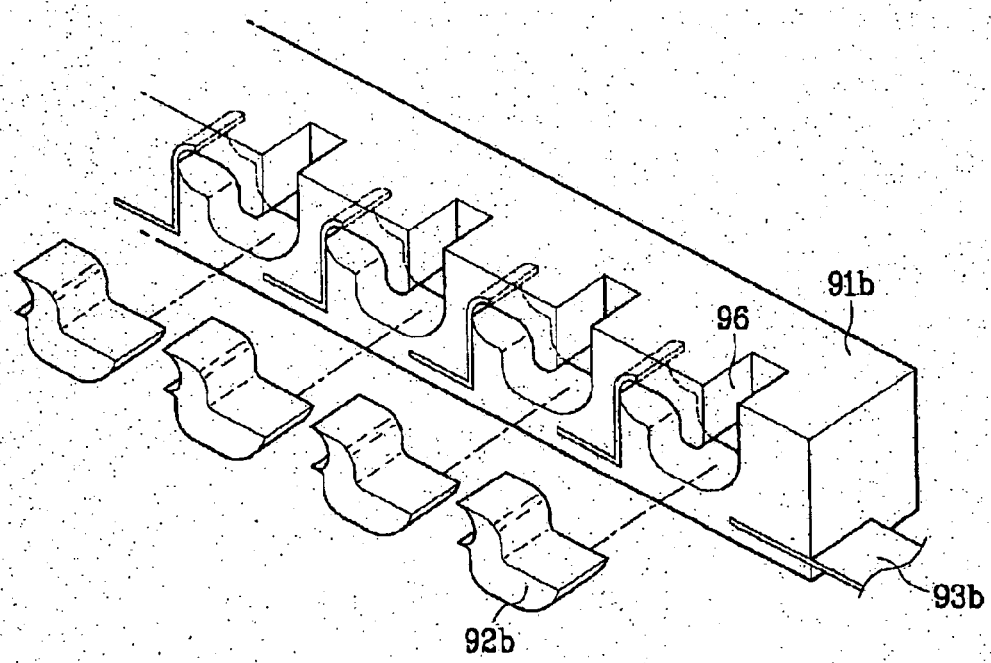
Figure 9C:
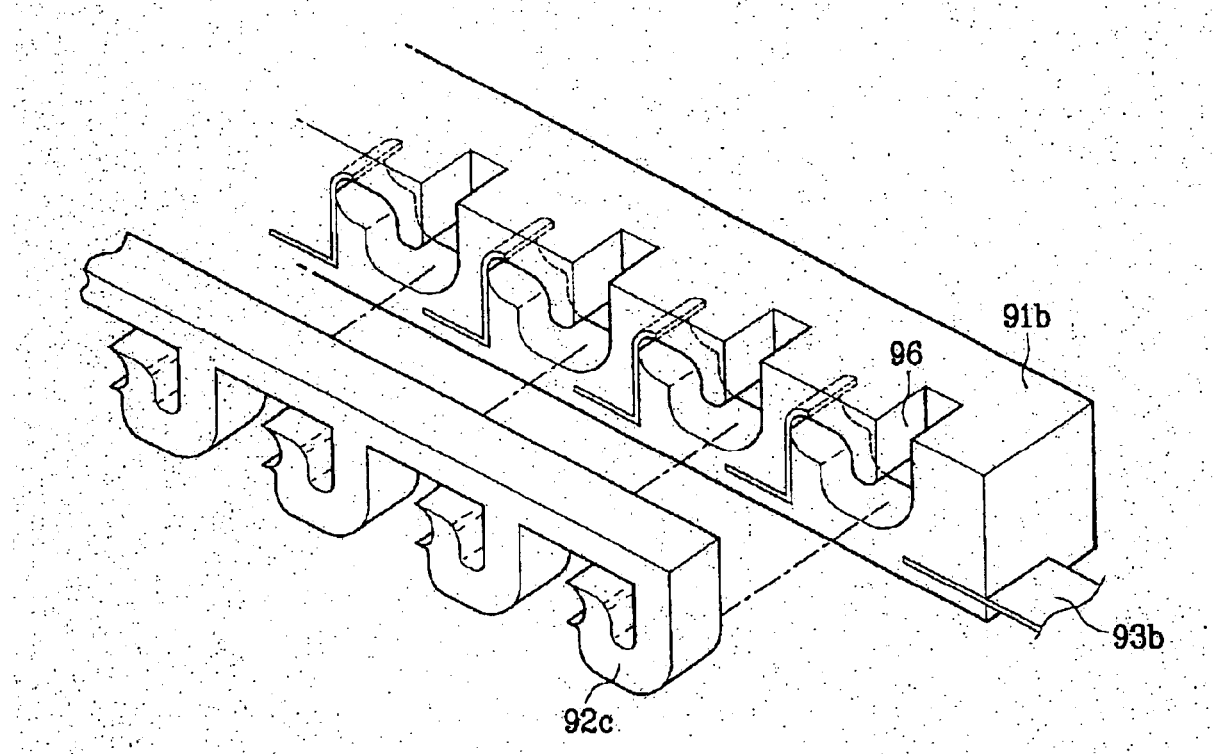

FIGS. 9A–9C are perspective views of another exemplary lamp fixing assembly and another exemplary lamp holder of a backlight device according to the present invention. In FIG. 9A, three times bent grooves 96 may be formed along a perpendicular direction from an upper surface of a lamp fixing assembly 91b, first bent along a horizontal direction, then bent along an upward vertical direction, and again bent along the horizontal direction. In addition, lamp holders 92 may be arranged in the respective grooves 96 to completely fill the remaining spaces of the grooves 96 after fluorescent lamps are arranged in the grooves 96. Furthermore, a conductive layer 93b may extend to contact one surface of each of the grooves 96 in which the fluorescent lamps are to be arranged.

In FIG. 9B, lamp holders 92b may be arranged in respective three times bent grooves 96 to partially fill the spaces of the grooves 96, thereby affixing fluorescent lamps in the grooves 96. In FIG. 9C, lamp holders 92c may be arranged in respective three times bent grooves 96 to completely fill the remaining spaces of the grooves 96 after fluorescent lamps are arranged in the grooves 96. Furthermore, two or more of the lamp holders 92c may also be integrally formed, thereby making the installment/replacement of the lamp holders 92c easier.

Figure 10:
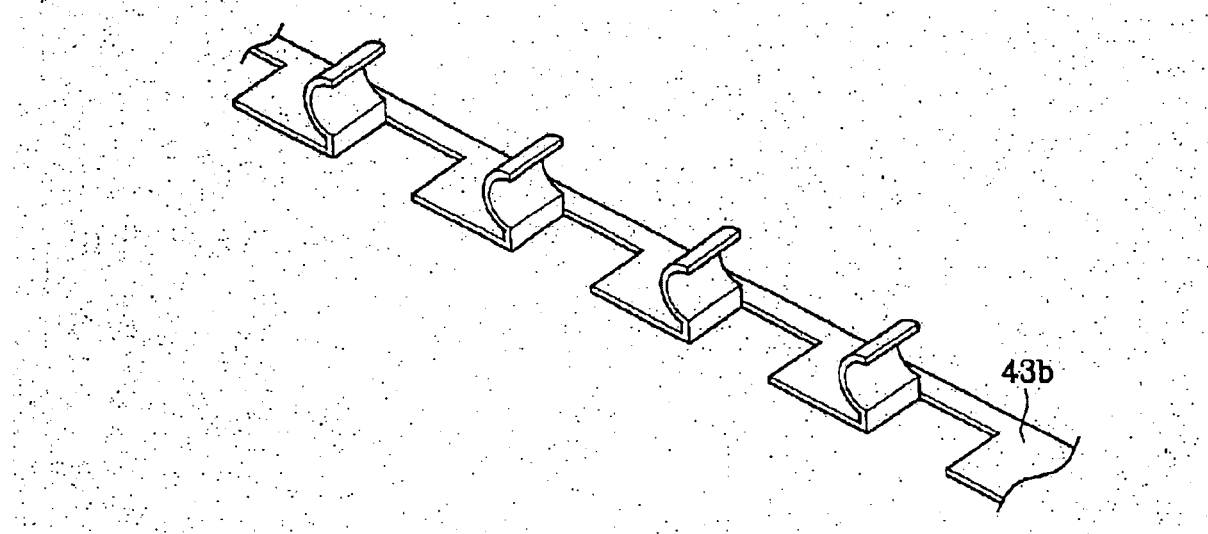
FIG. 10 is a perspective view of an exemplary conductive layer of a backlight device according to the present invention.

FIG. 10 is a perspective view of an exemplary conductive layer of a backlight device according to the present invention. In FIG. 10, conductive layer 43b may have bent portions to contact one surface of the fluorescent lamps 31 arranged in the grooves 46, shown in FIG. 4, along a length direction. Also, the conductive layer 43b may be placed within the lamp fixing assemblies 41a and 41b, shown in FIG. 4.

Figure 11:
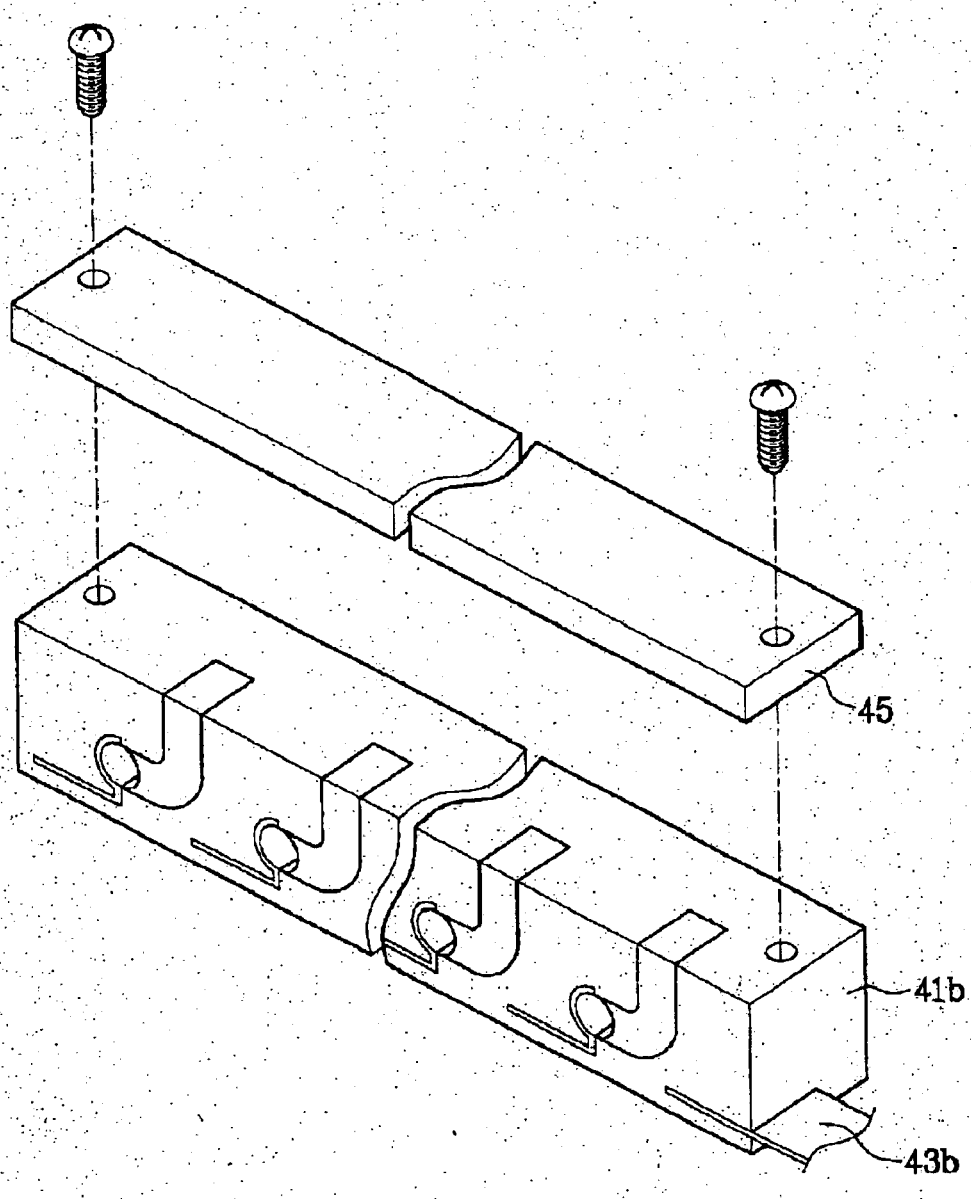
FIGS. 11 and 12 are perspective views of another exemplary lamp fixing assemblies of a backlight device according to the present invention.
Figure 12:
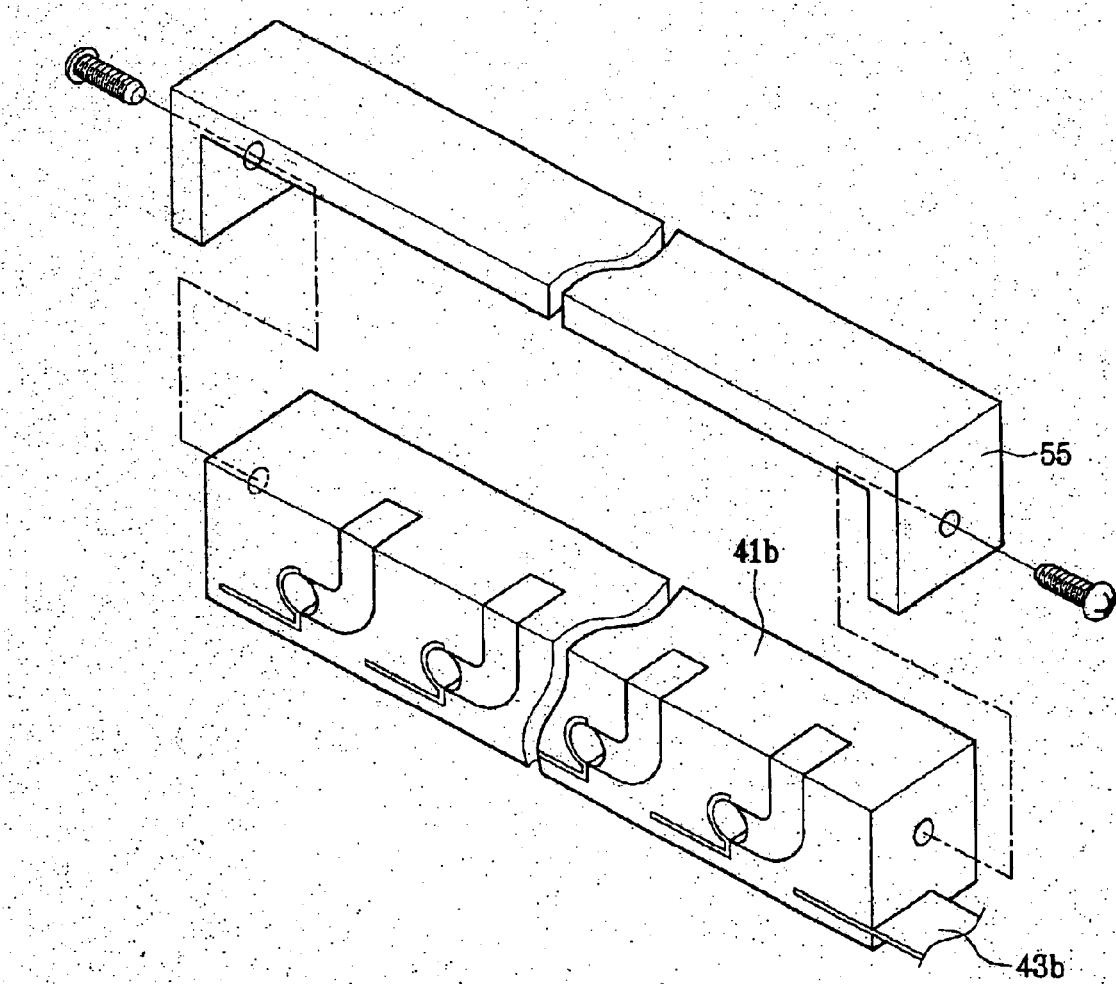

FIGS. 11 and 12 are perspective views of another exemplary lamp fixing assemblies of a backlight device according to the present invention. In FIG. 11, an additional upper instrument 45 may be formed on a lamp fixing assembly 41b. The second upper instrument 45 may be screw-coupled with the lamp fixing assembly 41b at both ends thereof, thereby reducing an external impact to the lamp fixing assembly 41b and securing lamp holders 42, shown in FIG. 4. In FIG. 12, an upper instrument 55 may be alternatively formed to enclose top and side surfaces of the lamp fixing assembly 41b. The upper instrument 55 may also be screw-coupled with the lamp fixing assembly 41b at side surfaces thereof, thereby reducing an external impact to the lamp fixing assembly 41b and securing lamp holders 42, shown in FIG. 4. In addition, a light scattering member (not shown), such as a diffusion sheet or a diffusion plate, may be further arranged on the upper instrument 45 or 55 for uniformly distributing light emitted from the fluorescent lamps onto a LCD panel (not shown).

Figure 13:
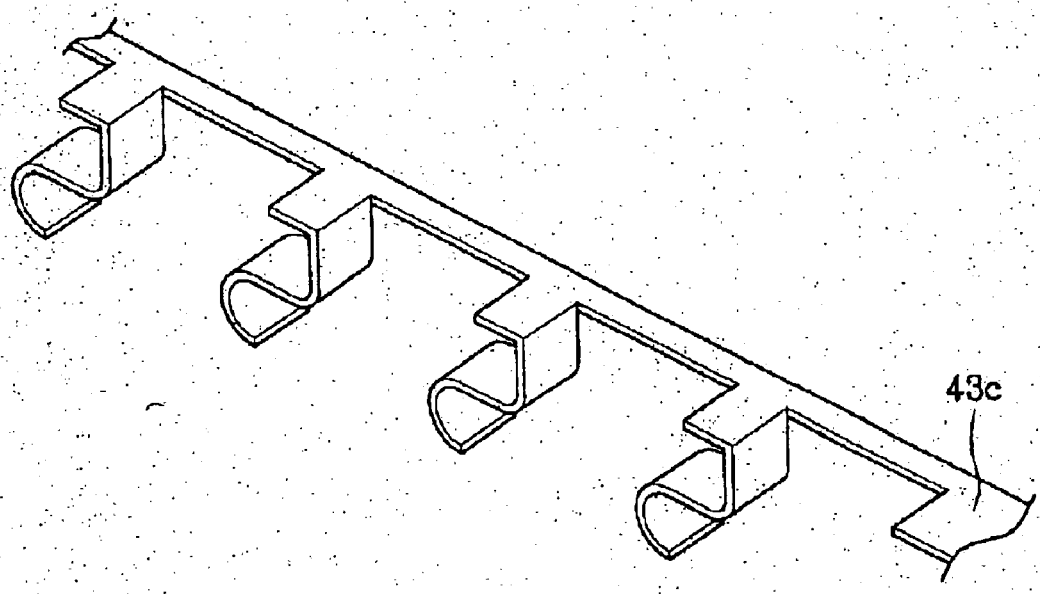
FIG. 13 is a perspective view of another exemplary conductive layer of a backlight device according to the present invention.

FIG. 13 is a perspective view of another exemplary conductive layer of a backlight device according to the present invention. In FIG. 13, a conductive layer 43c may be formed to extend along the length direction on a lamp fixing assembly, contact one surface of each of grooves in the lamp fixing assembly, and enclose one surface of each of fluorescent lamps arranged inside the grooves. Accordingly, the conductive layer 43c may be formed to match the bent shapes of the grooves.

The aforementioned backlight devices may be used as light sources for various display devices such as LCDs at rear side or front side thereof, or may be used as a fluorescent device by themselves.

The aforementioned backlight device of the present invention has the following effects. First, since a fluorescent lamp may be arranged in the aforementioned lamp fixing assembly having at least once bent groove and then affixed by a lamp holder, such that the fluorescent lamp is protected from an external impact. Secondly, the aforementioned backlight device does not require an individual connector for each of the fluorescent lamps, thereby simplifying the connection between the fluorescent lamps and a lamp driving circuit, increasing efficiency, and decreasing production costs. Thirdly, the aforementioned lamp fixing assembly simplifies assembling and disassembling of elements. Fourthly, since the fluorescent lamp is arranged in the groove and then fixed by a separate lamp holder, the closeness, between the fluorescent lamp and the conductive layer is enhanced to elevate the efficiency of the fluorescent lamp. Fifthly, it is easy to fabricate the backlight device as a large-sized light source, so that the backlight device of the present invention can be actively used for a large-sized LCD device.

It will be apparent to those skilled in the art that various modifications and variations can be made in the backlight device and the method of fabricating the same of the present invention without departing from the spirit or scope of the invention. Thus, it is intended that the present invention cover the modifications and variations of this invention provided they come within the scope of the appended claims and their equivalents.

What is claimed is:

1. A backlight device, comprising:
   a plurality of fluorescent lamps arranged parallel with each other along a first direction;
   first and second lamp fixing assemblies arranged facing each other along a second direction, the first and second lamp fixing assemblies having a plurality of at least once bent grooves to receive both ends of the fluorescent lamps;
   a plurality of lamp holders disposed within the grooves to affix both ends of each of the plurality of fluorescent lamps to the grooves; and
   first and second conductive layers disposed at the first and second lamp fixing assemblies to supply a voltage to the fluorescent lamps.

2. The backlight device according to claim 1, wherein the first and second lamp fixing assemblies are arranged at a predetermined interval along the first direction to correspond to a length of the fluorescent lamps.

3. The backlight device according to claim 1, wherein the grooves are formed along a vertical direction from upper surfaces of the first and second lamp fixing assemblies and bent along the second direction.

4. The backlight device according to claim 1, wherein the grooves have tapering widths.

5. The backlight device according to claim 4, wherein at least portions of the grooves have the same widths as a diameter of the fluorescent lamps.

6. The backlight device according to claim 1, wherein the grooves have a twice bent-shape.

7. The backlight device according to claim 6, wherein the grooves are formed along a vertical direction from upper surfaces of the first and second lamp fixing assemblies, bent along the second direction, and bent again along the vertical direction.

8. The backlight device according to claim 1, wherein the grooves have a three times bent shape.

9. The backlight device according to claim 8, wherein the grooves are formed along a vertical direction from upper surfaces of the first and second lamp fixing assemblies, bent in along the second direction, then bent along the vertical direction, and bent again along the second direction.

10. The backlight device according to claim 1, wherein the lamp holders completely fill a remaining space of the grooves after the fluorescent lamps are arranged within the grooves.

11. The backlight device according to claim 1, wherein the lamp holders partially fill a remaining space of the grooves after the fluorescent lamps are arranged within the grooves.

12. The backlight device according to claim 1, wherein two or more of the lamp holders are integrally formed.

13. The backlight device according to claim 1, wherein the lamp holders include electrically nonconductive material.

14. The backlight device according to claim 13, wherein the lamp holders include one of an elastic material and a rigid material.

15. The backlight device according to claim 14, wherein the rigid material includes one of rubber, acryl, poly carbonate and plastic.

16. The backlight device according to claim 1, wherein the conductive layers contact one surface of each of the fluorescent lamps.

17. The backlight device according to claim 1, wherein the conductive layers are arranged along the direction within the first and second lamp fixing assemblies.

18. The backlight device according to claim 1, wherein the conductive layers enclose one surface of each of the grooves and one surface of each of the fluorescent lamps respectively.

19. The backlight device according to claim 1, wherein the conductive layer includes one of a metal plate and a conductive coating film.

20. The backlight device according to claim 1, further comprising first and second upper covers affixed on the first and second lamp fixing assemblies.

21. The backlight device according to claim 1, further comprising one of a diffusion sheet and a diffusion plate arranged on the first and second lamp fixing assemblies for scattering light.

22. The backlight device according to claim 1, further comprising a reflection plate arranged below the first and second lamp fixing assemblies and below the fluorescent lamps.

23. The backlight device according to claim 1, wherein the fluorescent lamps have external electrodes at both ends thereof.

24. The backlight device according to claim 1, wherein the fluorescent lamps are eletrodeless.

25. A method of fabricating a backlight device, comprising the steps of:

forming first and second lamp fixing assemblies facing each other along a first direction;

forming a plurality of at least once bent grooves in the first and second lamp fixing assemblies along a second direction;

arranging ends of a plurality of fluorescent lamps within the grooves;

disposing a plurality of lamp holders within the grooves to affix the ends of each of fluorescent lamps to the grooves; and disposing first and second conductive layers at the first and second lamp fixing assemblies to apply a voltage to the fluorescent lamps.

26. The method according to claim 25, further comprising a step of integrally forming two or more of the lamp holders.

27. The method according to claim 26, wherein the step of disposing a plurality of lamp holders includes disposing the integrally formed lamp holders within the grooves.

28. The method according to claim 25, further comprising a step of forming first and second upper covers on the first and second lamp fixing assemblies.

29. The method according to claim 25, further comprising a step of forming one of a diffusion sheet and a diffusion plate on the first and second lamp fixing assemblies for scattering light.

30. The method according to claim 25, further comprising a step of forming a reflection plate below the first and second lamp fixing assemblies and below the fluorescent lamps.

* * * * *